UNITED STATES PATENT OFFICE.

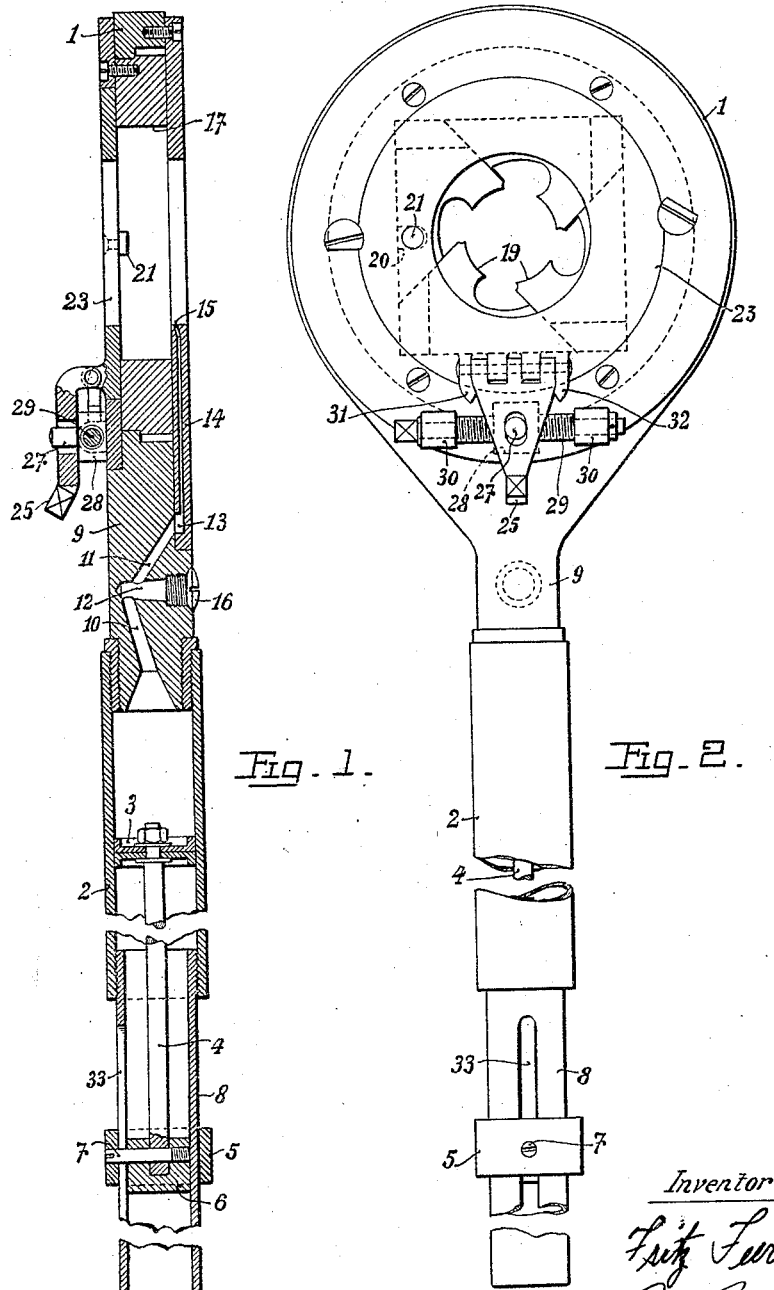

FRITZ FEER, OF BASEL, SWITZERLAND.

DIE-STOCK.

1,307,580.  Specification of Letters Patent.  Patented June 24, 1919.

Application filed March 24, 1915, Serial No. 16,753. Renewed November 29, 1918. Serial No. 264,719.

*To all whom it may concern:*

Be it known that I, FRITZ FEER, engineer, a citizen of the Swiss Confederation, residing at Basel, Streitgasse 7, Switzerland, have invented new and useful Improvements in Die-Stocks, of which the following is a specification.

The invention relates to adjustable screw thread cutting means and particularly to stock or die heads in which the dies are mounted in contact with each other and formed with coacting surfaces so inclined that lateral pressure applied to one of the dies produces a corresponding movement of the other dies toward or away from a common center.

It has already been proposed to design and use screw-stocks in which a lubricant is stored in a handle which is made hollow for this purpose. The existing screw-stocks of this type had the disadvantage that on the one hand the lubrication could not be effected without interrupting the work and on the other hand no means had been provided to guide the oil to the exact spot where it was most needed.

The object of this invention is to provide an improved screw-stock of the class described in which the means for storing the oil and for guiding the same to the dies are greatly improved. Other features of the invention reside in the adjusting means and in the arrangements and combinations of the various parts, all of which will be more fully described in connection with the accompanying drawings, in which:

Figure 1 is a front elevation parts being broken away,

Fig. 2 is a longitudinal section of the screw-stock the dies being removed.

In the drawings 1 denotes a ring having on its outer side an extension 9 to which extension 9 is screwed a tube 2. In the tube 2 there is a plunger 3 rigidly fixed to a rod 4. The free end of rod 4 is attached to a ring 5 by means of a piston 6 and of a pin 7. The ring 5 is slidably mounted on an extension 8 of the tube 2; the pin 7 projects through a slot 33 arranged in said extension 8. In the part 9 borings 10, 11 are provided communicating with a bore 12. The boring 10 leads from the tube 2 to the bore 12 and the boring 11 from the bore 12 to a distributing groove 13 arranged in a ring 14. The ring 14 is fixed to the ring 1 and the groove 13 is provided with a spout 15 arranged in the inner face of said ring 14. The bore 12 is closed by a screw 16. The bores 10 and 11 do not enter at the same level into the bore 12, the entrance of the boring 11 being nearer to the screw 16, may be closed by the spout of a funnel while the boring is left free. Thus the tube 2 may be easily filled.

In the ring 1 a second ring 17 is arranged having a square opening 18, for the adjustable reception of the dies 19 which are slidable on each other and in the said opening 18. One of the dies 19 is provided with a recess 20 into which a pin 21 projects. The pin 21 is rigidly fixed to a disk 23 which is rotatably mounted in the ring 1 and which is secured against axial displacement by means of screws 24 in the well known manner. On the disk 23 a lever 25 is hinged. The lever 25 is provided with a slot 26 into which a pin 27 of a nut 28 projects. The nut 28 is arranged on a screw spindle 29 journaled in bearings 30 of the ring 1. The nut 28 is secured against rotation and by rotating the spindle 29 the nut is moved, the lever 25 and the disk 23 take part on the movement of the nut 28 and the dies 19 are moved to or from the center according to the direction in which the spindle 29 is turned. If a quick adjustment of the dies 19 is desired the lever 25 is brought out of engagement with the nut 28 and turned in the direction desired, the disk 23 is provided with stops 31, 32 coacting with the nut 28. The stops 31, 32 prevent the turning of the disk 23 in such a degree that the dies 19 come out of engagement with each other.

The feeding of oil to the work piece may be made according to requirements, the operator may vary the pressure on the oil in any desired manner and may put pressure on for any desired time. No valves are in the oil supply borings and a clogging of the bores is impossible. The tube 2 may be filled through the bore 12 which is readily opened and closed and the tube 2 can be filled to the stop excluding air totally. Piston and piston rod are arranged in such a manner that they cannot be damaged. The adjusting device works as well for dies with right-handed screw threads as with left-handed threads.

Modifications and changes may be made without departing from the spirit and scope of the invention except as required by the claim, and I do not restrict myself to the precise construction, I have shown and described.

Having thus described my invention I declare that what I claim as new and desire to secure by Letters Patent is:

In a die stock of the character described, in combination, a ring having an exterior extension, a tubular handle secured to said extension, a disk rotatably mounted in said ring, an annulus having a square opening arranged in said ring, dies adjustably secured in said annulus and adapted to slide on each other and in said square opening, one of said dies being recessed, a pin secured to said disk projecting into the recess of one of said dies, a lever hinged to said disk and provided with a slot, a screw spindle secured to the ring, a nut on said spindle secured against rotation and stops on said disk coöperating with said nut for preventing a rotation of the disk apt to bring the dies out of engagement with each other, substantially as described and for the purpose set forth.

In testimony whereof I affix my signature in presence of two witnesses.

FRITZ FEER.

Witnesses:
FRITZ UTER,
CARL GUBLER.